US012236761B2

(12) United States Patent
Kojima

(10) Patent No.: US 12,236,761 B2
(45) Date of Patent: Feb. 25, 2025

(54) FENCE MONITORING SYSTEM, FENCE MONITORING APPARATUS, AND FENCE MONITORING METHOD

(71) Applicant: NEC CORPORATION, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/234,173

(22) Filed: Aug. 15, 2023

(65) Prior Publication Data

US 2023/0401941 A1 Dec. 14, 2023

Related U.S. Application Data

(63) Continuation of application No. 17/289,462, filed as application No. PCT/JP2018/041348 on Nov. 7, 2018, now Pat. No. 11,763,648.

(51) Int. Cl.
*G08B 13/12* (2006.01)
*G08B 13/196* (2006.01)

(52) U.S. Cl.
CPC ..... *G08B 13/124* (2013.01); *G08B 13/19641* (2013.01)

(58) Field of Classification Search
CPC ................ G08B 13/124; G08B 13/122; G08B 13/19641; G08B 13/19654; G08B 13/19689; G08B 13/19695; G08B 13/1969
See application file for complete search history.

(56) References Cited

U.S. PATENT DOCUMENTS

| | | | |
|---|---|---|---|
| 9,743,013 | B1 | 8/2017 | Merrill |
| 2003/0185419 | A1 | 10/2003 | Sumitomo |
| 2004/0046661 | A1 | 3/2004 | Vaccaro |
| 2004/0257218 | A1 | 12/2004 | Shibata et al. |
| 2005/0147341 | A1 | 7/2005 | Patel |
| 2006/0083458 | A1 | 4/2006 | Iffergan |
| 2006/0197665 | A1 | 9/2006 | Shibata et al. |
| 2017/0039826 | A1 | 2/2017 | Cojocaur |

FOREIGN PATENT DOCUMENTS

| | | | |
|---|---|---|---|
| CN | 102045120 | A | 5/2011 |
| CN | 204719894 | U | 10/2015 |
| CN | 105608822 | A | 5/2016 |
| JP | H06-217316 | A | 8/1994 |

(Continued)

OTHER PUBLICATIONS

OptaSense distributed acoustic and seismic sensing using COTS fiber optic cables for Infrastructure Protection and Counter Terrorism; Gregory L. Duckworth et al.; OptaSense, Inc. 27 Moulton St., Cambridge, MA, USA 02138 (Year: 2013).*

(Continued)

*Primary Examiner* — Daniell L Negron
(74) *Attorney, Agent, or Firm* — Sughrue Mion, PLLC

(57) ABSTRACT

A monitoring system according to the present disclosure includes a cable (20) comprising an optical fiber, a reception unit (31) configured to receive an optical signal including a pattern corresponding to a state of a monitoring target (10) from at least one optical fiber included in the cable (20) and to detect the pattern from the received optical signal, and a control unit (32) configured to detect the state of the monitoring target (10) based on the pattern.

13 Claims, 8 Drawing Sheets

(56) References Cited

FOREIGN PATENT DOCUMENTS

| | | | | | |
|---|---|---|---|---|---|
| JP | 2005-032224 | A | | 2/2005 | |
| JP | 2006/172339 | A | | 6/2006 | |
| JP | 2006-208061 | A | | 8/2006 | |
| JP | 2006-209575 | A | | 8/2006 | |
| WO | WO-2007114661 | A1 | * | 10/2007 | ........... G08B 13/186 |
| WO | 2009/046465 | A2 | | 4/2009 | |
| WO | WO-2011138773 | A1 | * | 11/2011 | ........... G08B 13/122 |

OTHER PUBLICATIONS

Japanese Office Communication for JP Application No., 2020-556404 mailed on Jan. 24, 2023 with English Translation.
International Search Report for PCT Application No. PCT/JP2018/041348, mailed on Jan. 8, 2019.
Japanese Office Action for JP Application No. 2020-656404 mailed on Aug. 23, 2022 with English Translation.
Non-Final Office Action issued in U.S. Appl. No. 17/289,462 dated Aug. 30, 2022.
Final Office Action issued in U.S. Appl. No. 17/289,462 dated Dec. 13, 2022.
Notice of Allowance issued in U.S. Appl. No. 17/289,462 dated May 23, 2023.
Japanese Office Action for JP Application No. 2023-069995 mailed on Apr. 2, 2024 with English Translation.
JP Office Action for JP Application No. 2023-069995, mailed on Jul. 23, 2024 with English Translation.

* cited by examiner

| FENCE | INSTALLED POSITION | INSTALLED AREA |
| --- | --- | --- |
| #1 | 10 m | X1 |
| #2 | 20 m | X1 |
| #3 | 30 m | X2 |
| : | : | : |

| VIBRATION PATTERN | PREDETERMINED EVENT OCCURRING IN FENCE |
|---|---|
| #1 | HIT FENCE |
| #2 | CLIMB FENCE |
| #3 | DIG AROUND FENCE |

| CAMERA | INSTALLED LOCATION | PHOTOGRAPHABLE AREA |
|---|---|---|
| #A | 35 m | X1, X2 |
| #B | 40 m | X1, X2 |
| #C | 20 m | X2, X3 |

Fig. 7

FENCE MONITORING SYSTEM, FENCE MONITORING APPARATUS, AND FENCE MONITORING METHOD

CROSS REFERENCE TO RELATED APPLICATION

This application is a continuation of U.S. application Ser. No. 17/289,462, filed Apr. 28, 2021 which is a National Stage of International Application No. PCT/JP2018/041348 filed Nov. 7, 2018, the entire contents of all of which are incorporated herein by reference.

TECHNICAL FIELD

The present disclosure relates to a monitoring system, a monitoring apparatus, a monitoring method, and a computer readable medium.

BACKGROUND ART

In related techniques, an abnormality in a monitoring target such as a fence has been monitored by a monitoring person in a monitoring room monitoring camera images of a plurality of cameras. For example, when the monitoring person determines that there is a suspicious point in the monitoring target, he/she turns the orientation of the camera towards the monitoring target and controls the camera to zoom in so as to detect an abnormality in the monitoring target. However, it may take a lot of time for a human to detect an abnormality in a monitoring target, which delay may cause a large increase in the cost of finding and handling the abnormality.

Thus, recently, a system for monitoring an abnormality in a monitoring target using an optical fiber has been proposed (e.g., Patent Literatures 1 to 3).

In the technique described in Patent Literatures 1 and 2, an FBG (Fiber Bragg Grating) optical fiber is laid on a fence and an OTDR (Optical Time-Domain Reflectometry) optical fiber is also laid on the fence. An intruder attempting to climb over the fence is detected by an FBG intrusion detector, and an intruder attempting to break the fence is detected by an OTDR intrusion detector. An ITV (Industrial Television) monitoring system provided in a monitoring room turns a shooting direction of an ITV camera to a detection location based on detection location information included in an intrusion detection signal from the intrusion detector.

In the technique described in Patent Literature 3, a plurality of FBG optical fibers are laid on a fence, and a pulse signal is output when an amount of a reflected wave shift of reflected waves generated in the optical fibers exceeds a predetermined threshold. Further, a table is prepared, in which events occurring in the fence classified according to the number of vibrations and fluctuation amount of the fence are associated with delays in times when pulse signals are generated and generation frequencies of the pulse signals in the respective plurality of optical fibers. Then, delays in times when pulse signals are generated and generation frequency of the pulse signals in the respective plurality of optical fibers are checked against the above-mentioned table in order to detect an event occurring in the fence.

CITATION LIST

Patent Literature

Patent Literature 1: Japanese Unexamined Patent Application Publication No. 2005-032224

Patent Literature 2: Japanese Unexamined Patent Application Publication No. 2006-172339

Patent Literature 3: Japanese Unexamined Patent Application Publication No. 2006-208061

SUMMARY OF INVENTION

Technical Problem

However, the techniques described in Patent Literatures 1 to 3 have a problem that it is necessary to use a special optical fiber called an FBG optical fiber. Further, the techniques described in Patent Literatures 1 and 2 have a problem that it is necessary to use an OTDR optical fiber together with an FBG optical fiber. Furthermore, the technique described in Patent Literature 3 has a problem that it is necessary to lay a plurality of optical fibers and receive reflected waves from the plurality of optical fibers.

Thus, an object of the present disclosure is to provide a monitoring system, a monitoring apparatus, a monitoring method, and a computer readable medium which solve the above-described problems and can detect a state of a monitoring target without using a special structure for detecting the state of the monitoring target.

Solution to Problem

In an example aspect, a monitoring system includes:

- a cable including an optical fiber;
- a reception unit configured to receive an optical signal including a pattern corresponding to a state of a monitoring target from at least one optical fiber included in the cable and to detect the pattern from the received optical signal; and
- a control unit configured to detect the state of the monitoring target based on the pattern.

In another example aspect, a monitoring apparatus includes:

- a reception unit configured to receive an optical signal including a pattern corresponding to a state of a monitoring target from at least one optical fiber included in a cable and to detect the pattern from the received optical signal; and
- a control unit configured to detect the state of the monitoring target based on the pattern.

In another example aspect, a monitoring method performed by a monitoring apparatus includes:

- receiving an optical signal including a pattern corresponding to a state of a monitoring target from at least one optical fiber included in a cable and to detect the pattern from the received optical signal; and
- detecting the state of the monitoring target based on the pattern.

In another example aspect, a non-transitory computer readable medium stores a program causing a computer to execute:

- a procedure for receiving an optical signal including a pattern corresponding to a state of a monitoring target from at least one optical fiber included in a cable and to detect the pattern from the received optical signal; and
- a procedure for detecting the state of the monitoring target based on the pattern.

Advantageous Effects of Invention

According to the above example aspects, it is possible to solve the above-described problems and achieve an effect that a state of a monitoring target can be detected without using a special structure for detecting the state of the monitoring target.

BRIEF DESCRIPTION OF DRAWINGS

FIG. 7 shows an example of camera information according to the embodiment;

DESCRIPTION OF EMBODIMENTS

Hereinafter, an embodiment of the present disclosure will be described with reference to the drawings. In the embodiment described below, as an example, a monitoring target to be monitored is described as a fence, but the monitoring target is not limited to a fence.

Embodiment

Configuration of Embodiment

First, a configuration of a monitoring system according to this embodiment will be described with reference to FIG. 1.

Figure 1:
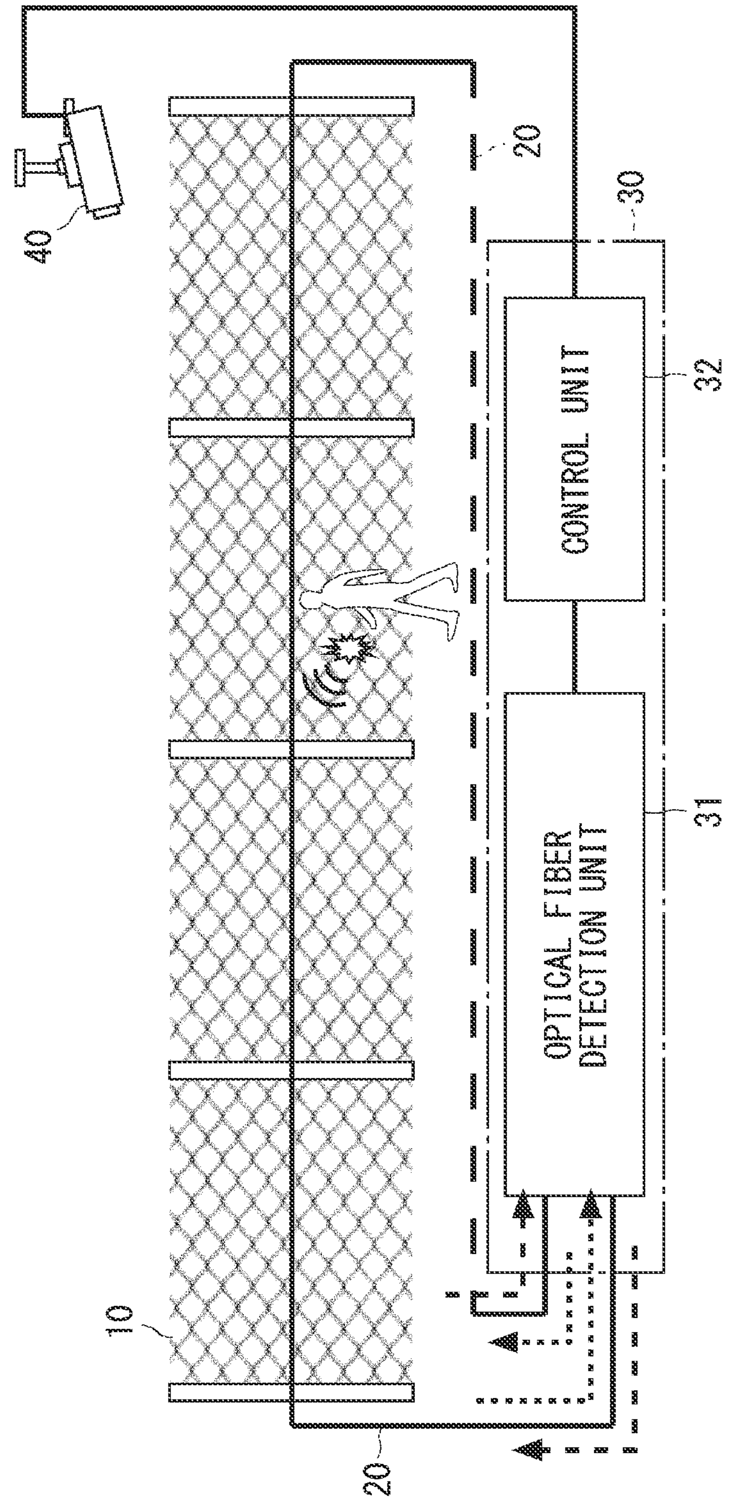
FIG. 1 shows an example of a configuration of a monitoring system according to an embodiment.

As shown in FIG. 1, the monitoring system according to this embodiment monitors fences 10 and its surroundings. The monitoring system includes an optical fiber cable 20, a monitoring apparatus 30, and a camera 40. The monitoring apparatus 30 includes an optical fiber detection unit 31 and a control unit 32. Note that the fence 10 may be composed of one fence. However, in this embodiment, the fences 10 are composed of a plurality of fences 10 connected to each other. The optical fiber detection unit 31 is an example of a reception unit.

The optical fiber cable 20 is formed by covering one or more optical fibers. The optical fiber cable 20 is laid on the fences 10 and buried in the ground along the fences 10. Specifically, the optical fiber cable 20 extends from the optical fiber detection unit 31 along the fences 10 and is turned back at a turning point and returns to the optical fiber detection unit 31. A part of the optical fiber cable 20 between the optical fiber detection unit 31 and the turning point is laid on the fences 10, and the other part of the optical fiber cable 20 is buried in the ground along the fences 10. However, the method of laying and burying the optical fiber cable 20 shown in FIG. 1 is an example and is not limited to this.

The camera 40 photographs an area where the fences 10 are installed. The camera 40 is implemented by, for example, a fixed camera, a PTZ (Pan Tilt Zoom) camera, or the like.

The monitoring system according to this embodiment monitors the fences 10 and its surroundings using an optical fiber sensing technique that uses an optical fiber as a sensor.

Specifically, the optical fiber detection unit 31 makes pulsed light incident on at least one optical fiber included in the optical fiber cable 20. Then, as the pulsed light is transmitted through the optical fiber in the direction of the fences 10, backscattered light is generated at each transmission distance. This backscattered light returns to the optical fiber detection unit 31 via the above-mentioned same optical fiber as the one through which the pulsed light is transmitted.

At this time, the optical fiber detection unit 31 makes the pulsed light incident in the clockwise direction and receives the backscattered light from this pulsed light in the clockwise direction and also makes the pulsed light incident in the counterclockwise direction and receives the backscattered light from this pulsed light in the counterclockwise direction. Thus, the optical fiber detection unit 31 receives the backscattered light from two directions.

Here, the fence 10 vibrates when an event such as a person grabbing and shaking the fence 10 occurs, and the vibration of the fence 10 is transmitted to the optical fiber. The vibration pattern of the vibration of the fence 10 transmitted to the optical fiber is a dynamically fluctuating pattern and differs according to the type of an event occurring in the fence 10 and its surroundings. In the first embodiment, for example, the following events are assumed as predetermined events that occur in the fences 10 and its surroundings.

(1) A person grabs the fence 10 and shakes it.

(2) A person hits the fence 10.

(3) A person climbs the fence 10.

(4) A person places a ladder against the fence 10 and climbs the ladder.

(5) A person or an animal wanders around the fence 10.

(6) A person digs around the fence 10.

Thus, the backscattered light received from the optical fiber by the optical fiber detection unit 31 includes a pattern corresponding to the state of the fence 10 and its surroundings, i.e., a pattern corresponding to an event occurring in the fence 10 and its surroundings. Therefore, in this embodiment, the state of the fence 10 and its surroundings is detected by the method described below by using the fact that the pattern corresponding to the state of the fence 10 and its surroundings is included in the backscattered light. Specifically, a predetermined event occurring in the fence 10 and its surroundings is detected.

Figures 2, 3:
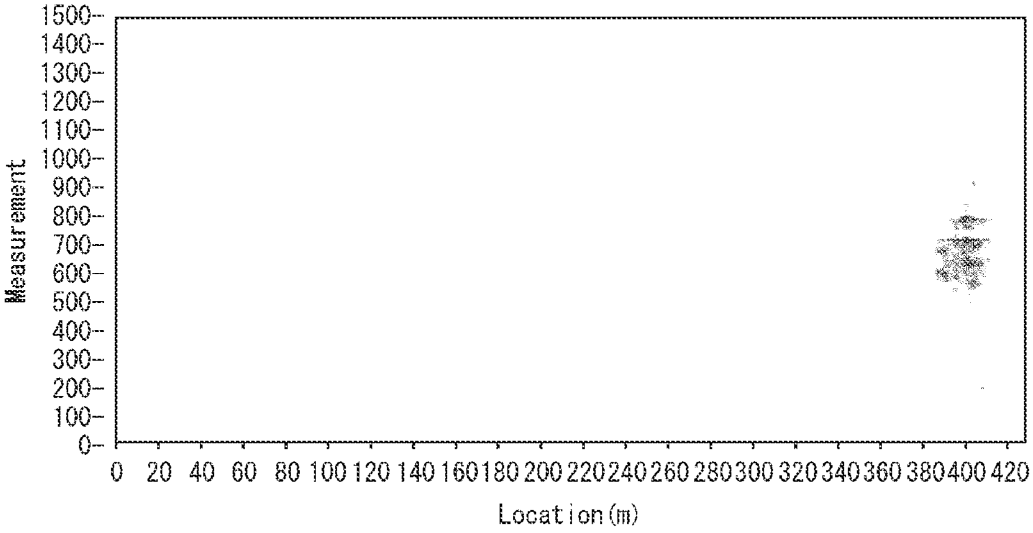
FIG. 2 shows an example of fence position information according to the embodiment.
FIG. 3 shows showing an example of vibration data generated by an optical fiber detection unit according to the embodiment.

The optical fiber detection unit 31 can identify the location of the fence 10 in which this backscattered light is generated based on a time difference between a time when the pulsed light is incident on the optical fiber and a time when the backscattered light is received from this optical fiber. Further, in this embodiment, as described above, the fences 10 are composed of a plurality of fences 10 connected to each other. Therefore, as shown in FIG. 2, the optical fiber detection unit 31 holds location information indicating installed locations of the plurality of fences 10 (distances from the optical fiber detection unit 31 in this example) and installed areas and the like of the plurality of fences 10, so that the optical fiber detection unit 31 can identify the fence 10 in which this backscattered light is generated from among the plurality of fences 10. Further, the optical fiber detection unit 31 can detect the strength of the vibration of the identified fence 10 by detecting the received backscattered light with a Distributed Vibration Sensor.

Thus, the optical fiber detection unit 31 can generate, for example, as sensing data vibration data as shown in FIG. 3. In FIG. 3, the horizontal axis represents the location (distance from the optical fiber detection unit 31), and the vertical axis represents the time elapsed.

In the example shown in FIG. 3, a vibration is generated at a location about 400 m away from the optical fiber detection unit 31. The optical fiber detection unit 31 can define a dynamic unique pattern of this vibration by detecting strength of a vibration, a vibration location, a transition of fluctuation in the number of the vibrations, and the like. Further, by the optical fiber detection unit 31 detecting a dynamic fluctuation pattern of a sound and a temperature together with this dynamic unique pattern, it is possible to detect a complex unique pattern of the fence 10 and its surroundings and to detect more sensitive and complicated operations and states.

Thus, in this embodiment, the control unit 32 performs machine learning (e.g., deep learning) on the vibration pattern when a predetermined event is occurring in the fence 10 and its surroundings and detects whether a predetermined event is occurring in the fence 10 and its surroundings using a result of the machine learning (initial training model).

First, a method of the machine learning will be described with reference to FIG. 4.

Figures 4, 5:
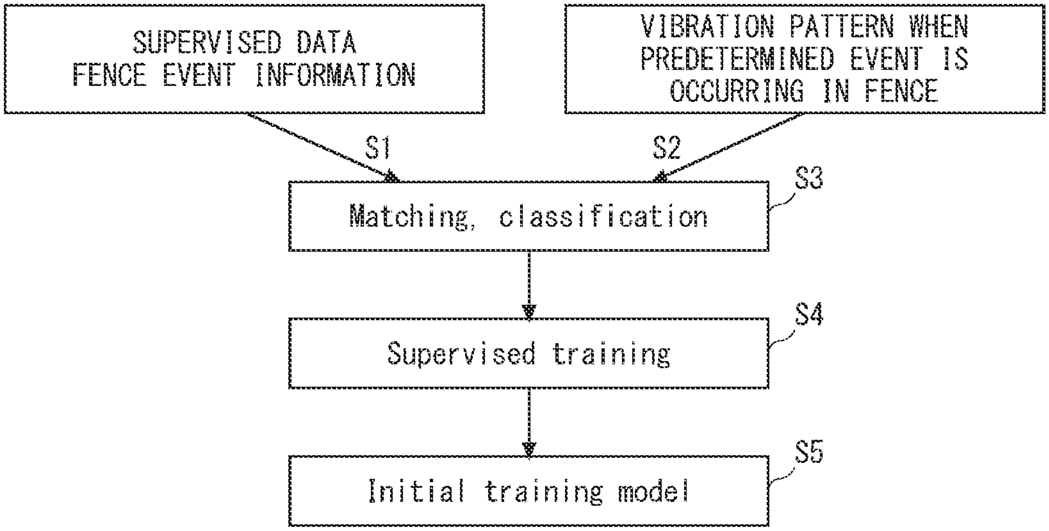
FIG. 4 shows an example of machine learning by a control unit according to the embodiment.
FIG. 5 shows an example of fence event information according to the embodiment.

As shown in FIG. 4, a plurality of vibration patterns are prepared when a predetermined event is occurring in the fence 10 and its surroundings. The control unit 32 inputs a plurality of vibration patterns and supervised data which is fence event information indicating a predetermined event occurring in the fence 10 and its surroundings when the vibration of the fence 10 matches the corresponding vibration pattern (Steps S1 and S2). FIG. 5 shows an example of the fence event information serving as the supervised data. The fence event information is held by the control unit 32.

Next, the control unit 32 checks the vibration patterns against the supervised data and classifies the vibration patterns (Step S3) and performs supervised learning (Step S4). By doing so, an initial training model is obtained (Step S5). When a vibration pattern corresponding to an event occurring in the fence 10 and its surroundings is input, this initial training model outputs a predetermined event that may be applicable if there is a possibility that this event may correspond to any of the predetermined event. Alternatively, this initial training model may output, together with a predetermined event that may be applicable, confidence at which this predetermined event occurs.

Next, a method of determining whether a predetermined event occurring is detected in the fence 10 and its surroundings will be described.

In this case, the control unit 32 first acquires a vibration pattern corresponding to an event occurring in the fence 10 and its surroundings from the optical fiber detection unit 31. Next, the control unit 32 inputs this vibration pattern to the initial training model. By doing so, since the control unit 32 can obtain a predetermined event that may be applicable as a result of the output from the initial training model, it detects that a predetermined event is occurring. Moreover, when the control unit 32 obtains confidence together with a predetermined event that may be applicable as a result of the output from the initial training model, it may determine that the predetermined event occurring is detected if the confidence is more than or equal to a threshold.

As described above, in this embodiment, the vibration pattern when a predetermined event is occurring in the fence 10 and its surroundings is machine-learned, and a result of the machine learning is used to detect a predetermined event occurring in the fence 10 and its surroundings.

It may be difficult in an analysis by a human to extract, from data, features for detecting an event occurring in the fence 10 and its surroundings. In this embodiment, by building a training model from a large number of patterns, it is possible to detect a predetermined event occurring in the fence 10 and its surroundings with high accuracy even when it is difficult in an analysis by a human to do so.

Note that in the machine learning according to this embodiment, in the initial state, a training model may be generated based on two or more pieces of supervised data. In addition, this training model may be made to newly learn a newly detected pattern. At this time, a specific condition for detecting a predetermined event occurring in the fence 10 and its surroundings may be adjusted based on the new training model.

Figure 6:
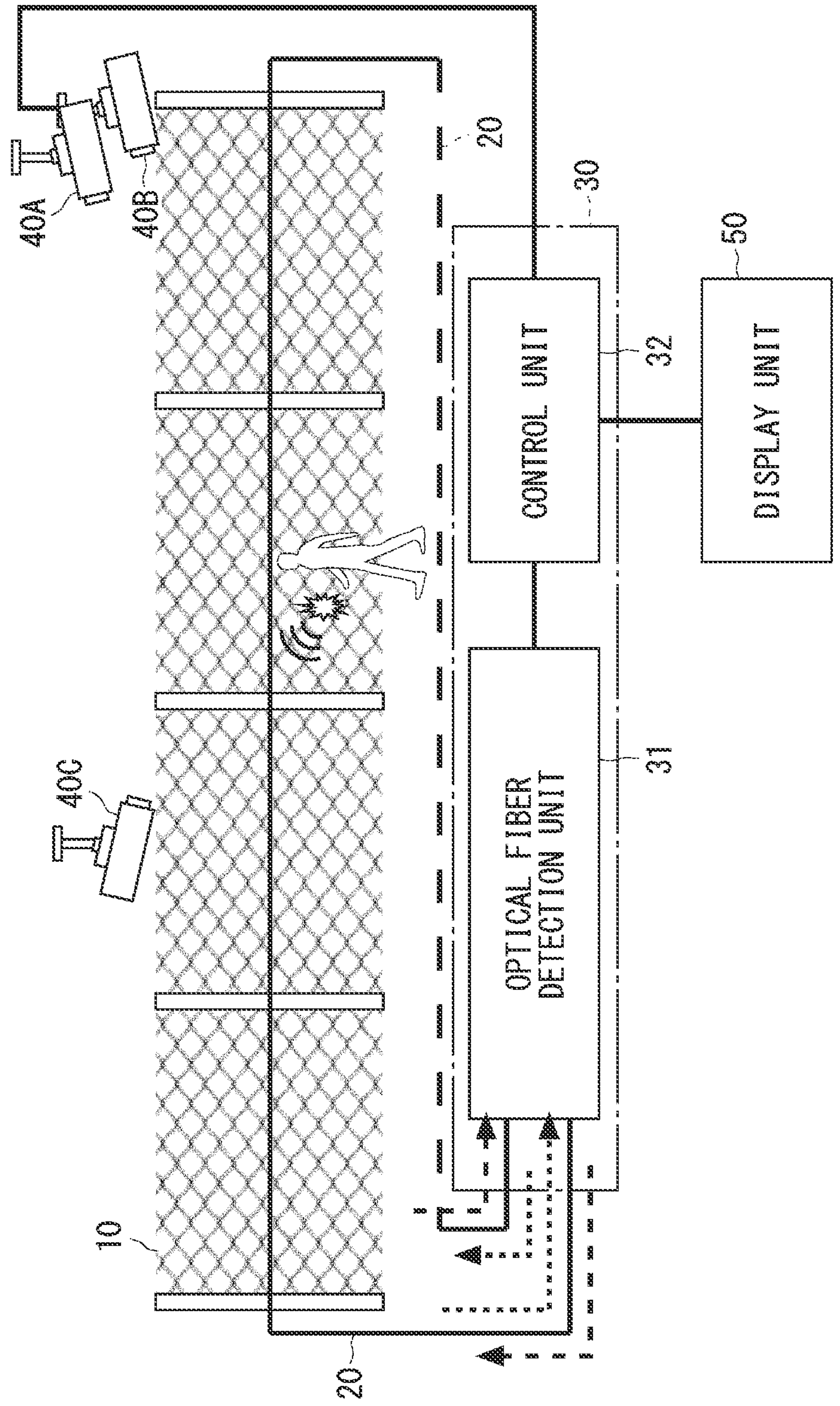
FIG. 6 shows an example of a configuration of a monitoring system according to a modified example of the embodiment.

Further, as shown in FIG. 6, the monitoring system according to this embodiment may include, in addition to a plurality of the cameras 40 (three cameras 40A to 40C in FIG. 6), a display unit 50 installed in a monitoring room or the like which monitors the entire area where the fences 10 are installed. Note that the plurality of cameras 40 may be installed so that the entire area where the fences 10 are installed can be photographed, although the number of installed cameras 40 and an installation spacing between the cameras are not particularly limited. For example, when a high-performance camera 40 having a long maximum shooting distance is used, the number of installed cameras can be reduced and the installation spacing between the cameras 40 can be increased.

As shown in FIG. 7, the control unit 32 holds camera information indicating installed locations (distances from the optical fiber detection unit 31) of the respective plurality of cameras 40, the photographable area, and so on. The control unit 32 can also acquire the location information of each of the plurality of fences 10 as shown in FIG. 2 from the optical fiber detection unit 31. Therefore, when the control unit 32 detects a predetermined event occurring in the fence 10 and its surroundings as described above, it identifies the camera 40 which photographs an area including the fence 10 in which the predetermined event is detected from among the plurality of cameras 40 based on the above-mentioned camera information and location information of the fence 10 and controls the identified camera 40. For example, the control unit 32 controls an angle (azimuth angle, elevation angle), zoom magnification, and so on of the camera 40. Further, the control unit 32 may change the control of the camera 40 according to a pattern of the detected state. For example, the control unit 32 may control the cameras 40 so that the plurality of cameras 40 track urgent operations (e.g., digging the surroundings and climbing over the fence 10, etc.) or control the camera 40 to, for example, zoom in so as to identify a face or person in more detail.

Figure 8:
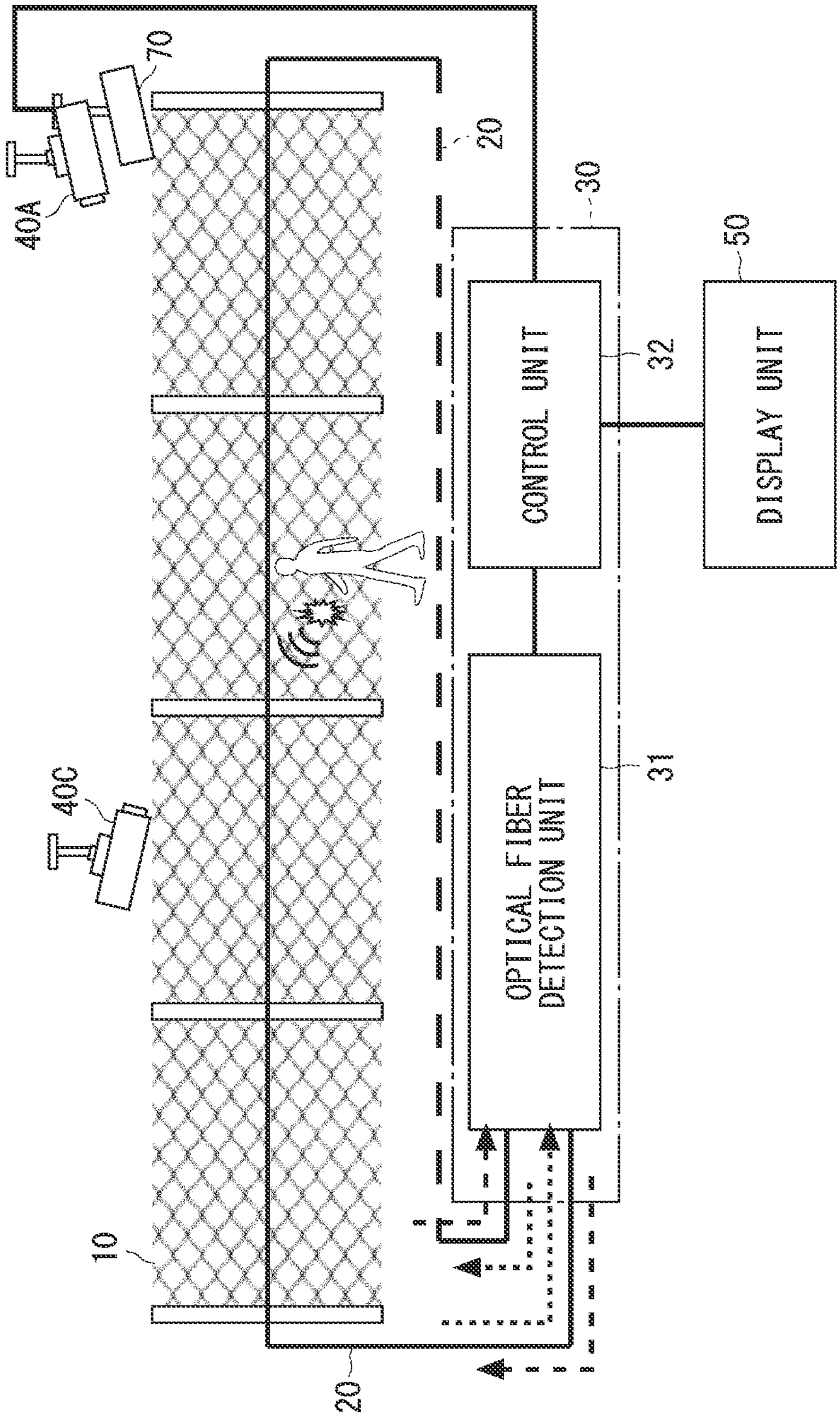
FIG. 8 shows another example of a configuration of the monitoring system according to the modified example of the embodiment.

Additionally, the control unit 32 may control two or more cameras 40 which photograph an area including the fence 10 in which the predetermined event is detected among the plurality of cameras 40. In this case, the function may be divided for each camera 40. For example, at least one of the two or more cameras 40 may photograph a face of a person present in the above-mentioned area, so that the photographed face image is used for face authentication, while another at least one of the two or more cameras 40 may photograph the above-mentioned entire area, so that the photographed image is used for monitoring a behavior of a person or an animal present in the above-mentioned area. Moreover, the two or more cameras 40 may photograph the area with different angles. Furthermore, at least one of the two or more cameras 40 may perform photographing to complement photographing of another camera 40. For example, when there is a blind spot that cannot be photographed by the other camera 40 in the above-mentioned area, the at least one camera 40 may photograph the blind spot. When there is a dark area at night, the control unit 32 may further control another camera 40 with a night vision function such as an infrared camera instead of the camera 40 for photographing the area or control the camera 40 to switch to a night vision mode. As shown in FIG. 8, the control unit 32 controls a spotlight 70. For example, when a predetermined event is detected in an area to be photographed by a camera 40A, the control unit 32 may control the spotlight 70 to be incident on the area.

The control unit 32 may further control the display unit 50 to display, for example, a sensing data image indicating sensing data generated by the optical fiber detection unit 31 and a camera image of the camera 40 which photographs an area including the fence 10 in which a predetermined event is detected based on the sensing data. However, a content of the display is not limited.

Next, a hardware configuration of a computer 60 that implements the monitoring apparatus 30 will be described with reference to FIG. 9.

Figure 9:
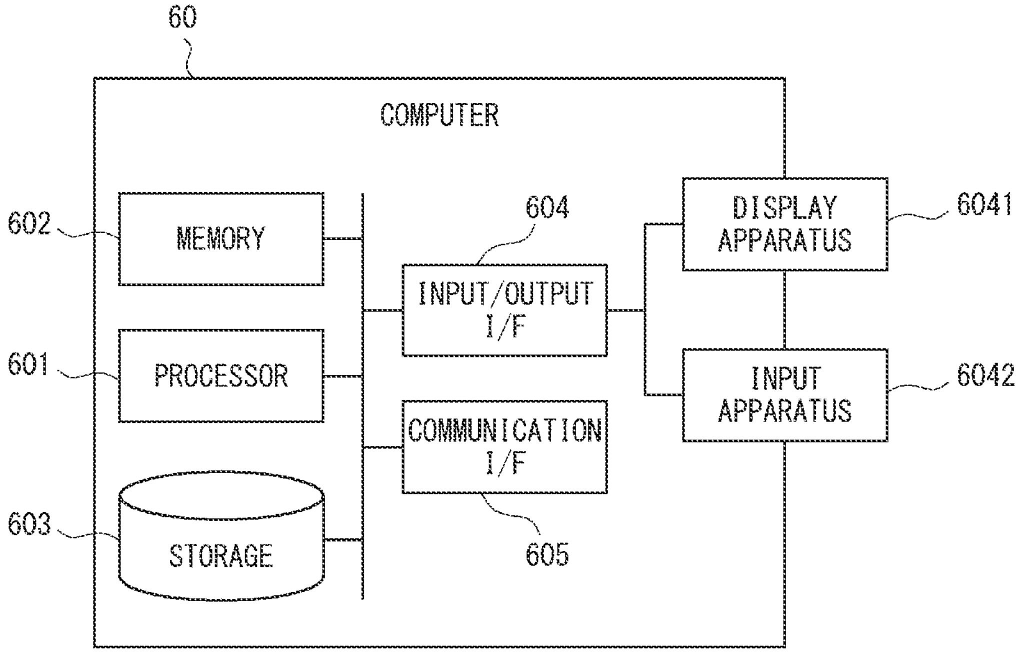
FIG. 9 is a block diagram showing an example of a hardware configuration of a computer that implements the monitoring apparatus according to the embodiment.

As shown in FIG. 9, the computer 60 includes a processor 601, a memory 602, a storage 603, an input/output interface (input/output I/F) 604, a communication interface (communication I/F) 605, and so on. The processor 601, the memory 602, the storage 603, the input/output interface 604, and the communication interface 605 are connected by a data transmission path for transmitting data to and receiving data from each other.

The processor 601 is an arithmetic processing apparatus such as a CPU (Central Processing Unit) or a GPU (Graphics Processing Unit). The memory 602 is a memory such as a RAM (Random Access Memory) or a ROM (Read Only Memory). The storage 603 is a storage apparatus such as an HDD (Hard Disk Drive), an SSD (Solid State Drive), or a memory card. The storage 603 may be a memory such as a RAM or a ROM.

The storage 603 stores programs that implement the functions of the optical fiber detection unit 31 and the control unit 32 included in the monitoring apparatus 30. The processor 601 implements the functions of the optical fiber detection unit 31 and the control unit 32 by executing the programs. Here, the processor 601 may execute these programs after reading them into the memory 602 or without reading them into the memory 602. The memory 602 and the storage 603 also play a role to store information and data held by the optical fiber detection unit 31 and the control unit 32.

The above programs can be stored and provided to a computer (including the computer 60) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 604 is connected to a display apparatus 6041, an input apparatus 6042, and so on. The display apparatus 6041 displays a screen corresponding to drawing data processed by the processor 601, such as an LCD (Liquid Crystal Display) or a CRT (Cathode Ray Tube) display. The input apparatus 6042 receives an operator's operation input and is, for example, a keyboard, a mouse, and a touch sensor. The display apparatus 6041 and the input apparatus 6042 may be combined and implemented as a touch panel. Note that the computer 60 may include a sensor (not shown) including a distributed vibration sensor, and the sensor may be connected to the input/output interface 604. The display unit 50 may be connected to the input/output interface 604.

The communication interface 605 transmits data to and receives data from an external apparatus. For example, the communication interface 605 communicates with an external apparatus via a wired communication path or a wireless communication path.

Operation of Embodiment

Hereinafter, an operation of the monitoring system according to this embodiment will be described. Here, an operation flow of the monitoring system according to this embodiment will be described with reference to FIG. 10.

Figure 10:
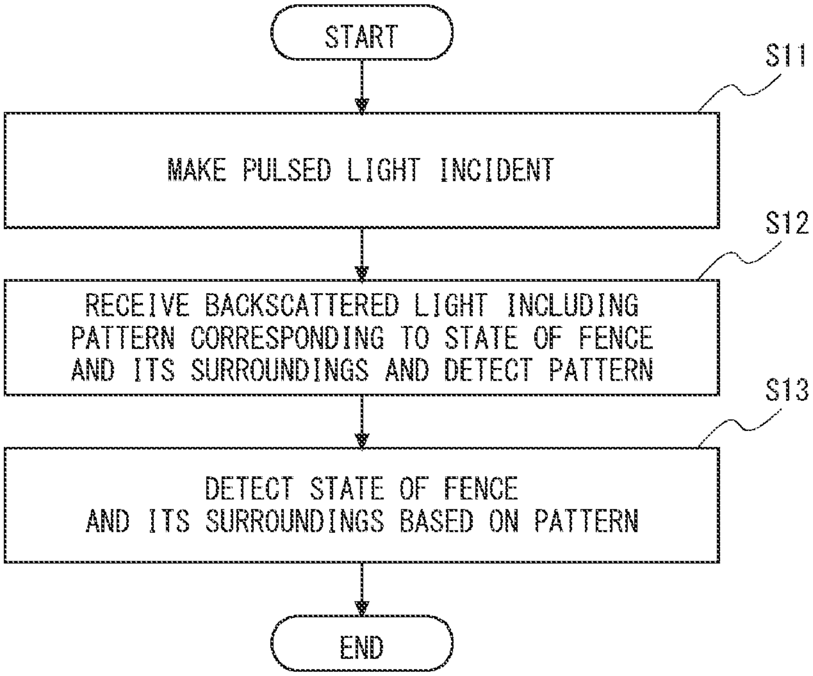
FIG. 10 is a flowchart showing an example of an operation flow of the monitoring system according to the embodiment.

As shown in FIG. 10, first, the optical fiber detection unit 31 makes pulsed light incident on at least one optical fiber included in the optical fiber cable 20 (Step S11).

Next, the optical fiber detection unit 31 receives backscattered light including a pattern corresponding to the state of the fence 10 and its surroundings from the same optical fiber as the optical fiber on which the pulsed light is incident and detects a pattern corresponding to the state of the fence 10 and its surroundings from the received backscattered light (Step S12). Specifically, the optical fiber detection unit 31 detects a pattern corresponding to an event occurring in the fence 10 and its surroundings. At this time, as described above, the optical fiber detection unit 31 detects strength of a vibration, a vibration location, a transition of fluctuation in the number of vibrations, and the like caused by the event occurring in the fence 10 and its surroundings, thereby detecting a dynamic fluctuation pattern of the fence 10 and its surroundings. Alternatively, the optical fiber detection unit 31 may further detect a dynamic fluctuation pattern in a sound and a temperature, thereby detecting a complex unique pattern in the fence 10 and its surroundings.

After that, the control unit 32 detects the state of the fence 10 and its surroundings based on the pattern detected by the optical fiber detection unit 31 (Step S13). Specifically, it is detected whether a predetermined event is occurring in the fence 10 and its surroundings. At this time, the control unit 32 may detect whether a predetermined event is occurring in the fence 10 and its surroundings by the above-described method of the machine learning.

Effect of Embodiment

As described above, according to this embodiment, backscattered light (light signal) including a pattern corresponding to the state of the fence 10 and its surroundings is received from at least one optical fiber included in the optical fiber cable 20, the pattern is detected from the received backscattered light, and the state of the fence 10 and its surroundings is detected based on the detected pattern. In this manner, since the state of the fence 10 and its surroundings is detected based on the pattern included in the backscattered light, it is not necessary to use a special optical fiber called an FBG optical fiber like in Patent Literatures 1 to 3, to use an OTDR optical fiber together with an FBG optical fiber like in Patent Literatures 1 and 2, and to lay a plurality of optical fibers like in Patent Literature 3. Therefore, the state of the fence 10 and its surroundings can be detected without using a special structure for detecting the state of the fence 10 and its surroundings. Moreover, the monitoring system can be built for a low cost, because a special structure is not required.

Further, according to this embodiment, the state of the fence 10 and its surroundings is detected based on the pattern corresponding to the state of the fence 10 and its surroundings included in the backscattered light. That is, instead of separating the states of the fence 10 according to the strength of vibrations and the number of vibrations like in Patent Literature 3 (e.g., the states are identified according to whether or not the vibration is large and whether or not the number of vibrations is high), in this embodiment, the state of the fence 10 and its surroundings is detected by a dynamic pattern analysis on the strength of the vibration and the number of vibrations (e.g., transition of a change in the strength of vibrations). This enables an accurate detection of the state of the fence 10 and its surroundings.

Further, according to this embodiment, the state of the fence 10 and its surroundings is detected based on a pattern corresponding to the state of the fence 10 and its surroundings included in backscattered light. This enables a clear isolation of a slight change such as an event in the surroundings of the fence 10 not involving contact with the fence 10 from other noise components including wind by detecting a dynamic pattern fluctuation, thereby accurately detecting a state in which this event is occurring.

Further, the FBG optical fiber used in Patent Literatures 1 to 3 has a configuration in which grating parts are provided at constant intervals, and in which an intruder is detected at the “points” where the grating parts are provided. On the contrary, in this embodiment, since a dynamic fluctuation pattern such as the vibration pattern in FIG. 4 is regarded as a “line” to detect the state of the fence 10, the resolution, sensitivity, and detection accuracy are improved as compared with Patent Literatures 1 to 3.

Moreover, according to this embodiment, the optical fiber sensing technique which uses an optical fiber as a sensor is used. Thus, this embodiment has advantages such that an optical fiber is not affected by electromagnetic noises, it is not necessary to supply power to a sensor, and it is possible to achieve excellent environmental resistance and easy maintenance.

Other Embodiments

In the above-described embodiment, an example in which the monitoring target is the fences 10 (and its surroundings) has been described, but the monitoring target is not limited to the fences 10 (and its surroundings). First, the installation site of the monitoring target may be an airport, a port, a plant, a nursing facility, a company building, a border, a nursery, a home, or the like. The monitoring target may be, a wall, a pipeline, a utility pole, a civil engineering structure, a floor, etc. in addition to a fence. Further, a laying or burying site of the optical fiber cable 20 when the monitoring target is monitored may be a wall, a pipeline, a utility pole, a civil engineering structure, a floor, etc., in addition to a fence and underground. For example, when the fence 10 installed in a nursing facility is to be monitored, examples of a predetermined event that could occur in the fence 10 include a person hitting the fence 10, a person leaning against the fence 10 due to injury or the like, and a person climbing over the fence 10 to escape.

In the above-described embodiment, it has been described that the fence 10 vibrates when a predetermined event occurs. However, when such an event occurs, a sound, a temperature, a strain, a stress, and the like change in the fence 10, and these changes are transmitted to the optical fiber. The patterns of a sound, a temperature, a strain, a stress, and the like are also dynamically fluctuating patterns and differ according to the type of an event occurring in the fence 10. For this reason, the optical fiber detection unit 31 may use a Distributed Acoustic Sensor, a Distributed Temperature Sensor, etc. in addition to a distributed vibration sensor to detect a change in a vibration, a sound, a temperature, strain, and stress, etc. and generate sensing data. Then, the control unit 32 may detect an event occurring in the fence 10 based on the sensing data in which the change in the vibration, the sound, the temperature, the strain, and stress, etc. is reflected. This further improves a detection accuracy.

In the above-described embodiment, when a predetermined event is occurring in the fence 10, the control unit 32 controls the angle, zoom magnification, and so on of the camera 40 which photographs an area including this fence 10. However, the control unit 32 may continue to control the camera 40 even after a predetermined event has occurred. For example, the control unit 32 may control the camera 40 to track a person, an animal, a car, and the like present in the above-mentioned area. Moreover, when a person wandering around the fence 10 leaves an object such as a suspicious object, the control unit 32 may control one camera 40 to photograph the object and another camera 40 to track the person.

Moreover, the optical fiber detection unit 31 and the control unit 32 of the monitoring apparatus 30 may be provided separately from each other. For example, the optical fiber detection unit 31 may be provided in a communication carrier station, and the monitoring apparatus 30 including the control unit 32 may be provided outside the communication carrier station.

In the above-described embodiment, only one optical fiber detection unit 31 is provided and the optical fiber cable 20 is occupied. However, the present disclosure is not limited to this.

For example, the optical fiber detection unit 31 may be provided in a communication carrier station, and the optical fiber cable 20 may be shared between existing communication equipment provided inside the communication carrier station and the optical fiber detection unit 31.

Alternatively, one optical fiber detection unit 31 may be provided in each of the plurality of communication carrier stations, and the detection unit fiber cable 20 may be shared between the plurality of optical fiber detection units 31 provided in the plurality of respective communication carrier stations.

Further alternatively, a plurality of optical fiber detection units 31 may be provided in one communication carrier station, and the optical fiber cable 20 may be shared between the plurality of optical fiber detection units 31.

Although the present disclosure has been described with reference to the embodiments, the present disclosure is not limited to the above-described embodiments. Various changes that can be understood by those skilled in the art can be made to the configurations and details of the present disclosure within the scope of the present disclosure.

The whole or part of the above embodiments can be described as, but not limited to, the following supplementary notes.

(Supplementary Note 1)

A monitoring system comprising:

a cable comprising an optical fiber;

a reception unit configured to receive an optical signal including a pattern corresponding to a state of a monitoring target from at least one optical fiber included in the cable and to detect the pattern from the received optical signal; and a control unit configured to detect the state of the monitoring target based on the pattern.

(Supplementary Note 2)

The monitoring system according to Supplementary note 1, wherein the control unit is configured to learn a pattern corresponding to the state of the monitoring target and to detect the state of the monitoring target based on a result of the learning and the pattern included in the optical signal received by the reception unit.

(Supplementary Note 3)

The monitoring system according to Supplementary note 1 or 2, further comprising a plurality of cameras, wherein the control unit is configured to control one camera which photographs an area including the monitoring target among the plurality of cameras.

(Supplementary Note 4)

The monitoring system according to Supplementary note 3, wherein the control unit is configured to control two or more cameras which photograph the area including the monitoring target among the plurality of cameras.

(Supplementary Note 5)

The monitoring system according to Supplementary note 4, wherein the control unit is configured to control at least one camera among the two or more cameras to photograph a face of a person present in the area and at least one camera among the two or more cameras to photograph the entire area.

(Supplementary Note 6)

The monitoring system according to any one of Supplementary notes 1 to 5, wherein the pattern is a fluctuation pattern which dynamically fluctuates.

(Supplementary Note 7)

A monitoring apparatus comprising:

a reception unit configured to receive an optical signal including a pattern corresponding to a state of a monitoring target from at least one optical fiber included in a cable and to detect the pattern from the received optical signal; and a control unit configured to detect the state of the monitoring target based on the pattern.

(Supplementary Note 8)

The monitoring apparatus according to Supplementary note 7, wherein the control unit is configured to learn a pattern corresponding to the state of the monitoring target and to detect the state of the monitoring target based on a result of the learning and the pattern included in the optical signal received by the reception unit.

(Supplementary Note 9)

The monitoring apparatus according to Supplementary note 7 or 8, wherein the control unit is configured to control one camera which photographs an area including the monitoring target among a plurality of cameras.

(Supplementary Note 10)

The monitoring apparatus according to Supplementary note 9, wherein the control unit is configured to control two or more cameras which photograph the area including the monitoring target among the plurality of cameras.

(Supplementary Note 11)

The monitoring apparatus according to Supplementary note 10, wherein the control unit is configured to control at least one camera among the two or more cameras to photograph a face of a person present in the area and at least one camera among the two or more cameras to photograph the entire area.

(Supplementary Note 12)

The monitoring apparatus according to any one of Supplementary notes 7 to 11, wherein the pattern is a fluctuation pattern which dynamically fluctuates.

(Supplementary Note 13)

A monitoring method performed by a monitoring apparatus, the monitoring method comprising:

receiving an optical signal including a pattern corresponding to a state of a monitoring target from at least one optical fiber included in a cable and detecting the pattern from the received optical signal; and detecting the state of the monitoring target based on the pattern.

(Supplementary Note 14)

A non-transitory computer readable storing a program causing a computer to execute:

a procedure for receiving an optical signal including a pattern corresponding to a state of a monitoring target from at least one optical fiber included in a cable and detecting the pattern from the received optical signal; and a procedure for detecting the state of the monitoring target based on the pattern.

REFERENCE SIGNS LIST

10 FENCE
20 OPTICAL FIBER CABLE
30 MONITORING APPARATUS
31 OPTICAL FIBER DETECTION UNIT
32 CONTROL UNIT
40, 40A to 40C CAMERA
50 DISPLAY UNIT
60 COMPUTER
601 PROCESSOR
602 MEMORY
603 STORAGE
604 INPUT/OUTPUT INTERFACE
6041 DISPLAY APPARATUS
6042 INPUT APPARATUS
605 COMMUNICATION INTERFACE
70 SPOTLIGHT

The invention claimed is:

1. A monitoring system comprising:

an optical fiber in contact with a fence;

at least one memory storing a computer program; and at least one processor configured to execute the computer program to:

receive a backscattered light including a pattern corresponding to a state of the fence from the optical fiber; and detect the state of the fence based on the pattern and a trained model, wherein the model has been trained according to patterns corresponding to the state of the fence, wherein the patterns include vibration patterns and at least one of sound fluctuation patterns or temperature fluctuation patterns.

2. A monitoring system according to claim 1, wherein the patterns correspond to predetermined events.

3. The monitoring system according to claim 2, wherein the predetermined events include at least one following state: (1) A person grabs the fence and shakes it; (2) A person hits the fence; (3) A person climbs the fence; (4) A person places a ladder against the fence and climbs the ladder; (5) A person or an animal wanders around the fence; and (6) A person digs around the fence.

4. The monitoring system according to claim 1, wherein the optical fiber is laid around the fence.

5. The monitoring system according to claim 1, wherein the at least one processor is further configured to execute the computer program to detect the patterns from the backscattered light.

6. A monitoring apparatus comprising:

at least one memory storing a computer program; and at least one processor configured to execute the computer program to:

receive a backscattered light including a pattern corresponding to a state of a fence from an optical fiber in contact with the fence; and detect the state of the fence based on the pattern and a trained model, wherein the model has been trained according to patterns corresponding to the state of the fence, wherein the patterns include vibration patterns and at least one of sound fluctuation patterns or temperature fluctuation patterns.

7. The monitoring apparatus according to claim 6, wherein the patterns correspond to predetermined events.

8. The monitoring apparatus according to claim 7, wherein the predetermined events include at least one following state: (1) A person grabs the fence and shakes it; (2) A person hits the fence; (3) A person climbs the fence; (4) A person places a ladder against the fence and climbs the ladder; (5) A person or an animal wanders around the fence; and (6) A person digs around the fence.

9. The monitoring apparatus according to claim 6, wherein the at least one processor is further configured to execute the computer program to detect the patterns from the backscattered light.

10. A monitoring method, performed by a monitoring apparatus, comprising:

receiving a backscattered light including a pattern corresponding to a state of a fence from an optical fiber in contact with the fence and;

detecting the state of the fence based on the pattern and a trained model, wherein the model has been trained according to patterns corresponding to the state of the fence, wherein the patterns include vibration patterns and at least one of sound fluctuation patterns or temperature fluctuation patterns.

11. The monitoring method according to claim 10, wherein the patterns correspond to predetermined events.

12. The monitoring method according to claim 11, wherein the predetermined events include at least one following state: (1) A person grabs the fence and shakes it; (2) A person hits the fence; (3) A person climbs the fence; (4) A person places a ladder against the fence and climbs the ladder; (5) A person or an animal wanders around the fence; and (6) A person digs around the fence.

13. The monitoring method according to claim 10, further comprising detecting the patterns from the backscattered light.

* * * * *